United States Patent [19]

Stokes

[11] Patent Number: 4,459,796
[45] Date of Patent: Jul. 17, 1984

[54] GATHERING PLANT TRASH

[76] Inventor: Ralph E. Stokes, P.O. Box 262, Wee Waa, New South Wales, 2388, Australia

[21] Appl. No.: 393,325

[22] Filed: Jun. 29, 1982

[51] Int. Cl.³ .................................... A01D 35/26
[52] U.S. Cl. ................................ 56/14.3; 56/500; 56/303
[58] Field of Search .................. 56/500, 503, 60, 63, 56/56, DIG. 4, 14.3

[56] References Cited

U.S. PATENT DOCUMENTS

| | | | |
|---|---|---|---|
| 306,771 | 10/1884 | Pierson | 56/60 |
| 2,269,530 | 1/1942 | Grant | 56/60 |
| 2,337,355 | 12/1943 | Spell | 56/60 |
| 2,436,831 | 3/1948 | Silva | 56/63 |
| 2,949,716 | 8/1960 | Thomson | 56/14.3 |
| 3,437,152 | 4/1969 | Barrantine | 56/500 |
| 3,550,361 | 12/1970 | Fakas | 56/60 |
| 3,712,035 | 1/1973 | Gildersleeve | 56/63 |
| 3,716,974 | 2/1973 | Wehde | 56/63 X |
| 3,871,162 | 3/1975 | Sckexnayder, Jr. | 56/14.3 |
| 3,914,923 | 10/1975 | Arends | 56/63 |
| 4,026,092 | 5/1977 | Welde | 56/14.3 |
| 4,160,356 | 7/1979 | Mathews | 56/DIG. 4 |
| 4,350,207 | 9/1982 | Ben-Dor | 56/14.3 |
| 4,397,136 | 2/1983 | McLeod | 56/503 |

*Primary Examiner*—Paul J. Hirsch
*Attorney, Agent, or Firm*—LeBlanc, Nolan, Shur & Nies

[57] ABSTRACT

A machine for gathering and disintegrating standing, row-planted, trash stems of crops such as cotton, pineapples etc., comprises a frame adapted to be travelled along a row of trash stems and direct them into the nip of rotating resilient rollers in mutual contact. The rollers are mounted on parallel shafts which are tilted so that the upper ends of the shafts are further ahead in the direction of machine travel than are their lower ends; thus, trash stems caught up between the rollers are uprooted and then presented to an array of scissoring blades whereby the stems are cut into short easily-disposable fragments.

6 Claims, 3 Drawing Figures

GATHERING PLANT TRASH

With a number of plants such as cotton, pineapples and others, after the crop has been harvested, stems and foliage ("trash") remain standing in the field and have to be cleared away before the field can be effectively prepared for re-planting.

This trash clearing is something of a problem for the farmer as it is a time and labour consuming task.

The object of this invention is to provide a simple machine which speedily and effectively gathers the trash and reduces it to a form facilitating its disposal.

The invention provides a trash gathering machine comprising:

(a) a machine frame adapted to be transversed over the ground along a row of standing trash stems, (b) a pair of parallel, rotatable shafts borne on said frame with their axes acutely angled from vertical disposition so that the upper ends of the shafts are further ahead in the direction of machine travel than are their lower ends.

(c) at least one trash-gathering resilient roller mounted on each of said shafts, said rollers being in mutual contact over a substantially flat chordal area common to both and lying, when said machine is in use, in a plane substantially coincident with that occupied by the standing trash stems.

(d) means to contra-rotate said rollers so that stems entering the leading end of said chordal area are uprooted and moved towards the trailing end of that area.

(e) an array of scissoring blades located adjacent the trailing end of said chordal area whereby trash stems emerging from said chordal area are transversely sheared into lengths which are fractional relative to the original stem lengths.

An example of the invention is illustrated, purely schematically, in the drawings herewith.

Figure 1:
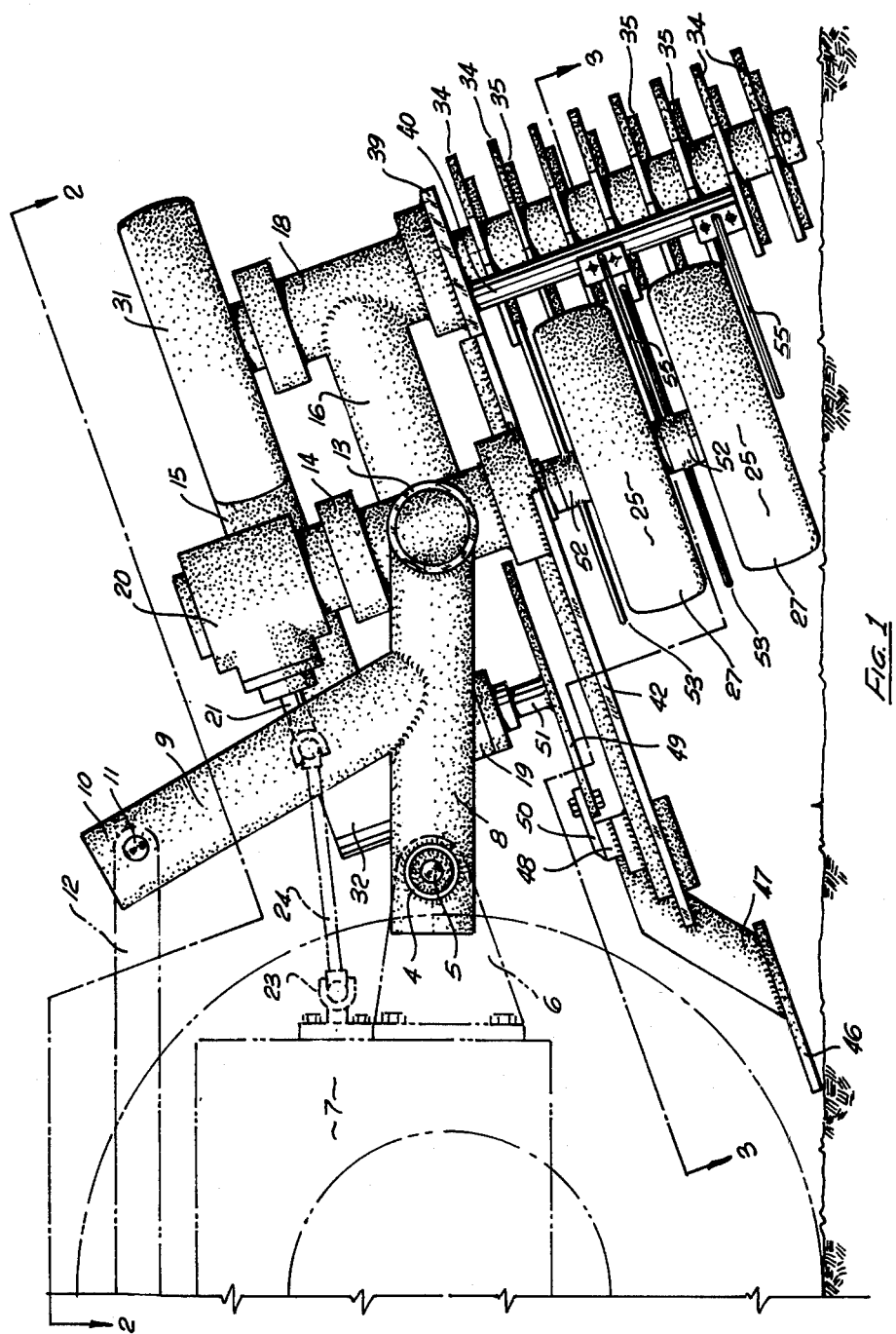
FIG. 1 is a side elevation of the operative parts of a trash gathering machine.

Referring to the drawings; the illustrated machine frame consists of a number of, preferably tubular, parts rigidly welded together to form a one-piece chassis structure. This structure may be equipped for working or idling transport in any convenient way. For example, the chassis structure may be regarded as starting in a cross-bar 4 having end journals 5 rotatable in bearing brackets 6 fixed on a tractor vehicle indicated at 7.

Cross-bar 4 is fixed to the leading end of a spinal bar 8. This car carries an outrigger 9 whereof the upper end 10 is pivotally connected (at 11) to a pull-rod 12 which operates (in conventional manner) to hold the machine in work position (as shown) or which (in equally conventional manner) may be hauled upon so to turn the whole machine about the axis of journals 5 thereby to elevate the machine clear of the earth when required.

As an alternative the machine may be supported on a conventional tractor three-point linkage at the points represented by journals 5 and point 11 thus to enable bodily elevation of the machine into its idling transport position.

The trailing end of bar 8 carries a cantilever arm 13 mounting two bearing sleeves; first bearing sleeve 14 and a second similar sleeve which is not seen in the drawings because it is directly behind sleeve 14 (FIG. 1) and directly under drive roller 15 shown (more clearly) in FIG. 2 and referred to later herein. Arm 13 has two branch arms 16 and 17 which respectively carry third bearing sleeve 18 and fourth bearing sleeve 19 (sleeve 17 is not seen in FIG. 1) because it is parallel with and directly behind spinal bar 8).

Sleeve 14 carries a gear-box 20 housing mitre gears (not shown) whereby driving shaft 21 is drive-connected to a first driven shaft 22 which is borne in sleeve 14. Driving shaft 21 is conventionally driven from a power take-off indicated at 23 through a universal shaft indicated at 24.

The first driven shaft 22 carries and rotates a number of resiliently tyred plant-gathering rollers 25. Each of these rollers consists of a hub 26 and resilient tyre 27. Ordinary automobile wheels will serve. Rollers 25 roll in frictional drive contact with an equal number of similar or companion rollers 28. The drive contact pressure between rollers 25 and 28 is such as to flatten the area of contact between them thereby establishing the chordal area 29 referred to previously herein.

Figure 2:
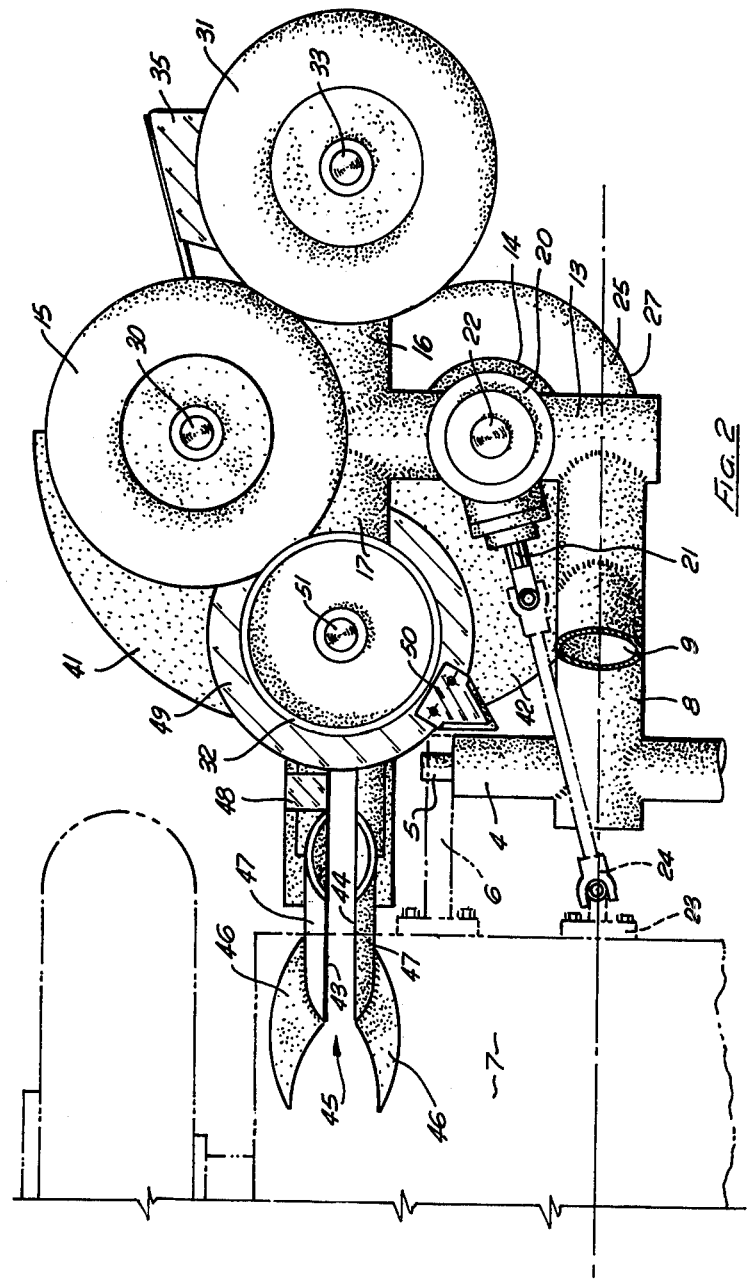
FIG. 2 is a plan looking in the direction indicated by line 2—2 in FIG. 1.
Figure 3:
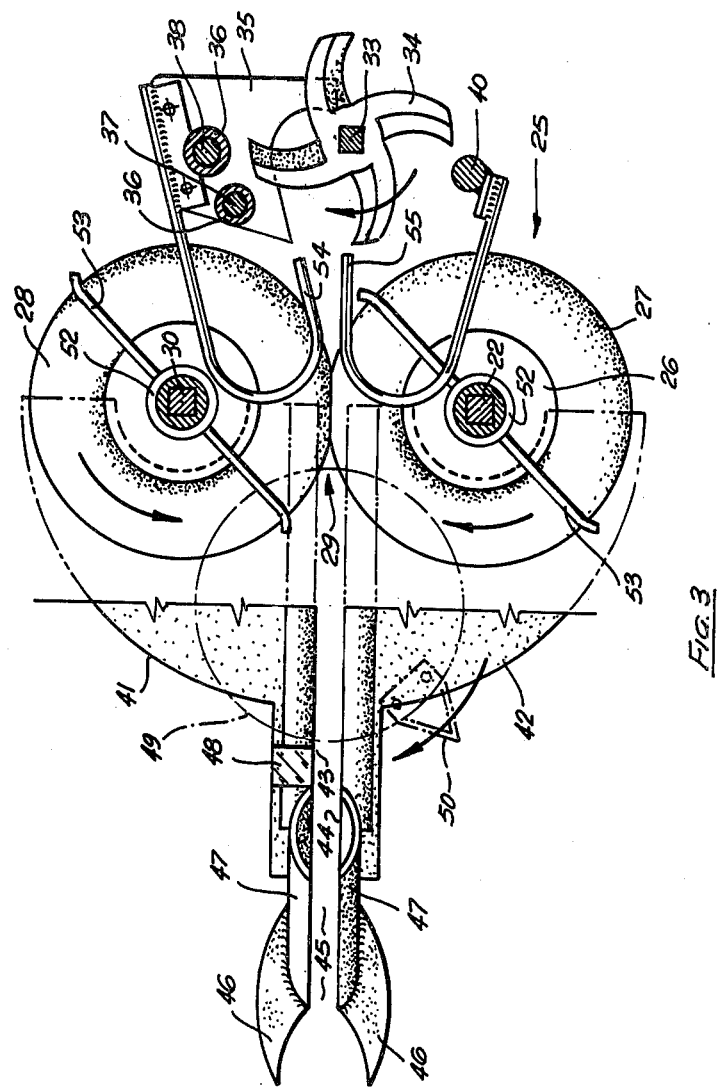
FIG. 3 is a sectional plan taken on line 3—3 in FIG. 1.

Rollers 28 are mounted on second driven shaft 30 which is borne in the second bearing sleeve, not shown in the drawings, but previously referred to as being directly behind sleeve 14 in FIG. 1.

The second driven shaft 30, at its upper end has the mentioned roller 15 keyed thereon. This roller 15 acts as drive roller to two other rollers 31 and 32.

Roller 31 is keyed on the upper end of a main cutter shaft 33, borne in the third bearing sleeve 18 and able to rotate a plurality (in this case eight) of rotary cutter wheels 34 mounted on the shaft. Cutters 34 operate in shear with an equal number of stationary cutter plates 35. These plates 35 (spaced apart by spacer collars 36) are carried on two support rods 37 and 38 fixed by their upper ends to a mounting plate 39 fixed on the lower end of the third bearing sleeve 18. A further support rod 40 (the purpose of which will be explained later) is also fixed by its upper end on mounting plate 39.

The first bearing sleeve 14 and its companion (the second bearing sleeve) preferably also acts as mountings for a pair of base plates 41 and 42 having mutually adjacent parallel edges 43 and 44 which, between them define a plant guide-way slot 45. This slot starts in a pair of plant-gathering wings 46, continues by way of gooseneck portions 47 and finishes at a point above and in the vicinity of the nip (29) of rollers 25 and 28.

One of the base plates (in this case plate 41) may carry a stationary shear blade 48 which is swept by a series of movable shear blades circumferentially mounted on a carrier disc 49. One of these movable shear blades is indicated at 50. Carrier disc 49 is keyed on a shaft 51 borne in the fourth bearing sleeve 19 and driven by roller 32.

The illustrated machine is one for dealing with only one row of plants per machine working run. In dealing with such a row, the machine is travelled along the row so that the standing plants enter between wings 46. If topping of the plants is required and blades 48 and 50 are therefore provided, topping is carried out at this point as the still-standing plants proceed (relatively) along guide-way slot 45. When the plants reach the nip of rollers 25 and 28 the inclination of those rollers is such as to apply a gentle uprooting force on the plants as they are advanced towards the cutting ambit of blades 34 and 35. The action of rollers 25 and 28 may be assisted by the provision of propulsion "spiders". These spiders each consist of a hub 52 and a plurality of radial prongs 53. They rotate with the rollers and may be placed between any one or more pairs thereof. There purpose is to help claw the upstanding plants towards and into the nip 29.

As the plants emerge from between rollers 25 and 28 they are presented to the scissoring cutters 34 and 35 so to be fractionated thereby. This presentation may be facilitated by the provision of appropriate guide means. For example, these guide means could consist of extension of the guide-way slot 45 towards the scissoring cutter assembly so that the guide-way stopped just short of the moving cutters 34. For preference however the guide means in question comprise two arrays of hook shaped fingers 54 and 55. Fingers 54 are fixedly mounted on stationary blades 35 and fingers 55 are fixedly secured on support rod 40.

It will be appreciated that the gathering machine as described above may be varied extensively without departure from the essense of the invention. For example, the machine may be provided with wheels so that it may be simply hauled along a line of plants by being coupled to a tractor. As a further alternative the machine can be built in the manner of an ordinary wheeled vehicle which is automotive on its own account.

As another alternative, instead of the machine trailing behind a tractor or like vehicle it could be mounted to one side of such a vehicle or even to the front thereof.

If desired, a further alternative could be provided in that the trailing end of the machine could be provided with a catcher bin or trailing vehicle, (somewhat in the nature of a grass catcher for an ordinary lawn mower) which would receive the fractionated stems so to facilitate their disposal.

As a further factor, the machine as described herein is adapted to transverse a single row of standing plants. It will be obvious that by lateral duplication of the machine any selected number of plant rows may be subject to trash fractioning simultaneously. This duplication may be in relation to a plurality of machines running side-by side, or it may apply only to the working parts of the machine. In that case all of the duplicated parts may be mounted on a single machine frame which may then be handled, during trash gathering, as a single machine.

On such a multi-basis the working parts of the machine may be adjustable laterally of the machine frame so that they may be suited for the gathering of trash stems placed in variously spaced-apart rows.

Other modifications may be made, for example:

Topping means, as represented by blades 48 and 50, may be omitted as with some forms of trash topping is not required. Useful work could still be done with the machine if a guideway (45) were to be omitted and the rollers 25 and 28 relied upon for plant pick-up without aid.

Again, although preferably present, guide fingers 54 and or spiders 52/53 could be omitted; and, obviously, rollers such as 25, instead of being two in number could be as few as one or more than two depending upon the height of the plants to be dealt with.

I claim:

1. A trash gathering machine comprising: a machine frame adapted to be traversed over the ground along a row of standing trash stems; a pair of spaced apart, side-by-side, parallel, rotatable shafts borne on said frame with their axes acutely angled from vertical disposition so that the upper ends of the shafts are further ahead in the direction of machine travel than are their lower ends; at least one pair of trash-gathering resilient rollers, each of which rollers is respectively mounted on the lower portion of each of said shafts, said pair of rollers being in mutual contact over a substantially flat chordal area common to both and laying, when said machine is in use, in a plane substantially coincident with that occupied by the standing trash stems; means to contra-rotate said rollers so that stems entering the leading end of said chordal contact area are uprooted, moved towards and expelled from the trailing end of that chordal contact area; an inclined array of scissoring blades located closely adjacent the trailing end of said chordal area whereby trash stems emerging and expelled from said chordal area are transversely sheared into lengths which are fractional relative to the original stem lengths, the inclination of said array of scissoring blades being essentially parallel with said rotatable shafts with the lowermost end of said array of blades being disposed closely adjacent the plane of the ground surface over which the machine is to be traversed.

2. A machine according to claim 1, wherein the means to contra-rotate said pair of trash-gathering rollers consist of a power source applied to the upper portion of a drive shaft which is borne on said frame, said drive shaft constituting one of said pair of rotatable shafts to which the associated one of said pair of trash-gathering rollers is drive keyed, and said pair of rollers being in frictional contact whereby rotation of said one roller frictionally causes contra-rotation of the other of said pair or rollers.

3. A machine according to claim 2, wherein said array of scissoring blades comprises a cutter drive shaft rotatably mounted on said frame, a plurality of stationary shear blades fixedly mounted on said frame, and an equal plurality of rotary shear blades mounted and keyed on said cutter drive shaft so as to be in shear contact with said stationary blades, and wherein said other of said trash-gathering rollers is drive keyed to its associated rotatable shaft which is a driven shaft parallel to said drive shaft and to said cutter drive shaft.

4. A machine according to claim 3 which includes means to rotate said cutter drive shaft consisting of a pair of resilient rollers in frictional contact and respectively keyed on the upper portions of said driven shaft and said cutter drive shaft.

5. A machine according to claim 1 wherein said frame incorporates guide-way means to direct standing trash stemsinto the said chordal area.

6. A machine according to claim 5 wherein said guide-way means incorporate blade devices to top trash plants proceeding to said chordal area.

* * * * *

UNITED STATES PATENT AND TRADEMARK OFFICE
CERTIFICATE OF CORRECTION

PATENT NO. : 4,459,796
DATED : July 17, 1984
INVENTOR(S) : Ralph E. Stokes

It is certified that error appears in the above-identified patent and that said Letters Patent is hereby corrected as shown below:

On Cover Page between Item [22] and Item [52], please insert the following:

--Foreign Application Priority Data,

July 10, 1981   Australia........PE 9695--

Signed and Sealed this

Eighteenth Day of December 1984

[SEAL]

Attest:

GERALD J. MOSSINGHOFF

Attesting Officer

Commissioner of Patents and Trademarks